Jan. 14, 1969
I. MICHALKO
3,421,945
FUSION-SEALED METAL-ENCLOSED RECHARGEABLE BATTERY CELL
Filed Aug. 11, 1965
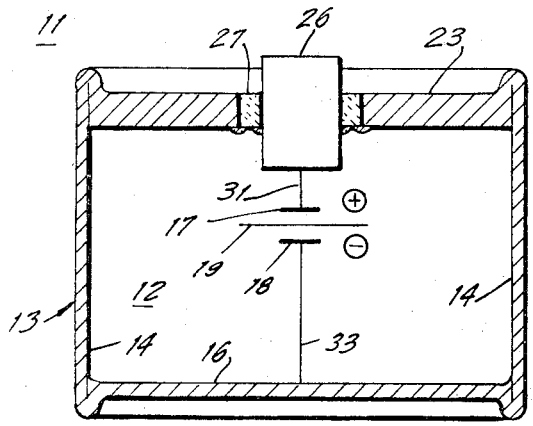
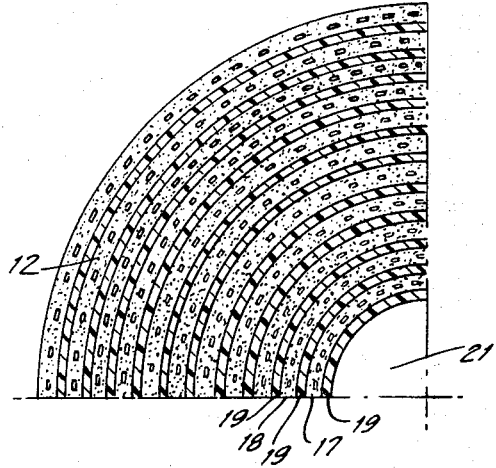
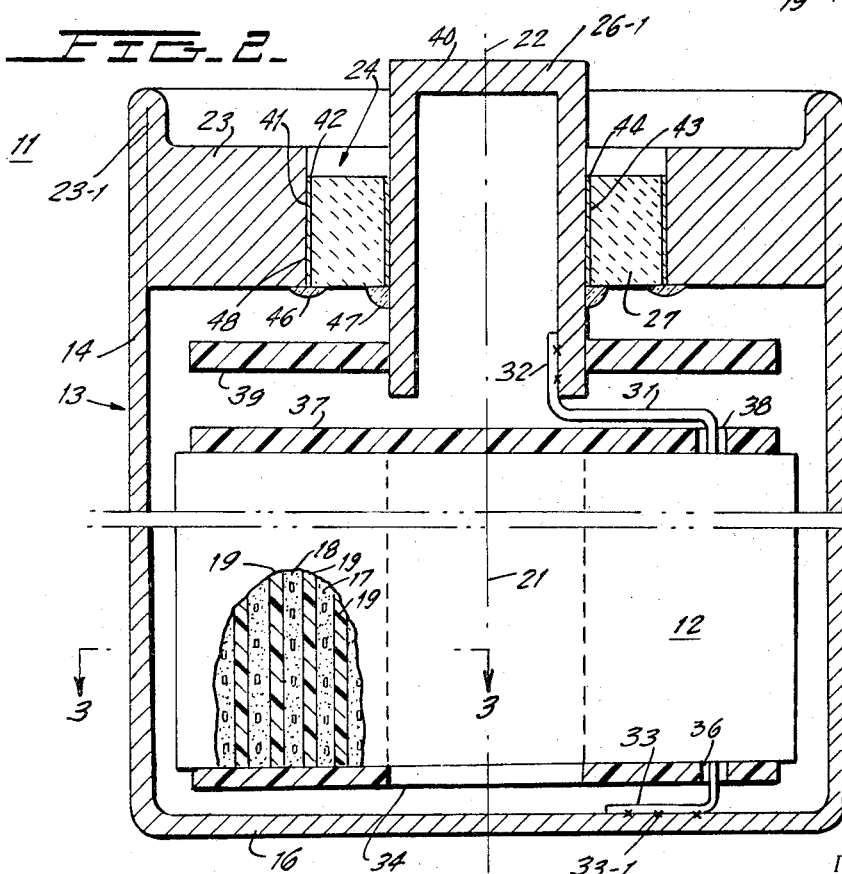
INVENTOR.
IGNATIUS MICHALKO
BY
OSTROLENK, FABER, GERB & SOFFEN
ATTORNEYS

United States Patent Office 3,421,945
Patented Jan. 14, 1969

3,421,945
FUSION-SEALED METAL-ENCLOSED
RECHARGEABLE BATTERY CELL
Ignatius Michalko, Ossinging, N.Y., assignor to Sonotone
Corporation, Elmsford, N.Y., a corporation of New
York
Filed Aug. 11, 1965, Ser. No. 478,813
U.S. Cl. 136—6                                    3 Claims
Int. Cl. H01m 1/02

ABSTRACT OF THE DISCLOSURE

A seal about the terminal member of a rechargeable alkaline battery cell, having an alkaline resistant ceramic collar joined to the adjacent metal surfaces of the terminal and cell casing by metallic fusion seals, in which a protective solidified molten glass seal is interposed between the metallic fusion seals and the cell interior for protecting the metal fusion seals from electrolyte penetration.

---

This invention relates to rechargeable electric battery cells and, more particularly, to hermetically sealed battery cells operating with an alkaline electrolyte.

As is well known, sealed rechargeable battery cells, such as nickel cadmium batteries, include at least one pair of porous, opposite polarity electrodes loaded with active electrode substances and separated by a porous insulating layer. The pores of the electrodes and of the insulating layer are saturated with a corrosive alkaline electrolyte. In typical designs the electrode assembly is mounted in a metal casing, and the negative and positive electrodes are respectively connected to the casing and to a separate metallic terminal insulatingly sealed to and carried within a portion of the casing.

One of the principal difficulties that have been encountered in the past with such sealed cell designs has been the leakage of the corrosive electrolyte through the insulating sealing joints, particularly under extreme environmental conditions. This leads to general deterioration of the sealing joints as well as to loss of electrolyte, thereby destroying the utility of the cell. Such disadvantages have been most pronounced in those cell designs in which the metallic terminal comprises a separate end wall that is crimped and sealingly clamped under pressure over an edge of the casing through an insulating gasket seal of plastic material.

Some improvement in resistance to such corrosion has been obtained by conductively sealing the end wall to the remainder of the casing and insulatingly affixing a separate terminal member (typically tubular in shape) to the sides of an aperture disposed in a central region of the end wall of the casing. This type of design is described, e.g., in U.S. Patent No. 3,064,065. In such arrangements, an inorganic gas-and-liquid-tight insulating collar is affixed to the periphery of the aperture in the end wall and to the separate terminal member by means of metallic fusion joints formed at elevated temperature. Such fusion joints are typically formed by first providing a metallized coating on the junction surfaces of the insulating collar, and then brazing the metallized surfaces to the aperture periphery and to the terminal member. Fusion joints formed in this manner have also been found to be satisfactorily impervious to gas pressure generated when the sealed alkaline battery cell is charged.

It has been found, however, that the corrosive action of the electrolyte tends to attack the metallized coatings on the insulating collar through the portions of the fusion joints exposed to the electrode assembly within the cell. The resultant corrosion generally leads to deterioration of the cell in a manner similar to that exhibited by the crimped-seal cell mentioned above.

One object of the invention, therefore, is to provide an arrangement for minimizing electrolyte leakage through the insulaitng joints of fusion sealed, rechargeable battery cells.

Another object of the invention is to provide an arrangement for preventing electrolyte corrosion of the metallized surface of the ceramic in alkaline-type rechargeable battery cells employing fusion seals between an insulating ceramic collar and the oppositely polarized metallic terminal portions of the cell.

These and related objects of the invention are realized in a specific illustrative embodiment thereof, in which an alkali-resistant glass layer is fused to each of a pair of gas-tight fusion joints formed between metal-coated portions of a ceramic collar and the oppositely poled terminals of the cell. The glass fusion seals are disposed around the portions of the respective metallic fusion junctions that are exposed to the electrolyte-bearing electrode assembly. The interposition of the alkali-resistant glass seals between the corrosive electrolyte and the corrosion-susceptible metallized coatings on the junction surfaces of the ceramic collar effectively confines the electrolyte to the interior of the cell and prevents deterioration of the above-described type.

One significant feature of the above arrangement is that the glass fusion seals are formed at a lower fusion temperature than that necessary for the primary metallic fusion seals between the ceramic collar and the respective mating surfaces of the aperture periphery and the terminal member. Thus, the auxiliary glass seals may be conveniently formed after the primary seals are made without disturbing the gas pressure-resistant properties of the primary seals.

The nature of the present invention and its various advantages and features are set forth more fully in the following detailed description of an illustrative embodiment thereof taken in connection with the appended drawing, in which:

FIG. 1 is a diagrammatic representation, partially in cross-section, of one form of alkaline-type rechargeable battery cell in accordance with the invention;

FIG. 2 is a sectional elevation of one form of battery cell, in accordance with FIG. 1;

FIG. 3 is a fragmentary sectional view, on a greatly enlarged scale, taken along line 3—3 of FIG. 2.

Referring now to the drawing, FIG. 1 depicts a sealed battery cell 11 employing the principles of the present invention. The battery 11, which illustratively comprises a nickel-cadmium cell operating with an alkaline electrolyte, includes an electrode assembly 12 mounted within a metallic casing 13. The casing 13 is formed from a suitable alkali-resistant material, such as nickel coated, cold-rolled sheet steel and is provided with a tubular side wall 14 and an integral bottom wall 16. The electrode assembly 12 consists of at least one pair of superposed electrode plates 17 and 18 of opposite polarity separated by an electrically insulating separator sheet or layer 19. The electrodes 17 and 18 and the separator 19 are made porous for the purpose of absorbing and immobilizing the alkaline electrolyte within the electrode assembly 12. Although the battery cell 11 may operate with any known form of electrode assembly (for instance a stack of vertically superposed electrode plates of alternating polarity), the electrode assembly 12 is illustratively in the form of a spiral coil (FIGS. 2 and 3).

The spirally coiled electrodes 17 and 18 of the electrode assembly 12 are in the form of sintered plates, the pores of which are suitably loaded with active electrode substances described, may be of the general type described in U.S.

Patent No. 2,702,212 and in the article "Nickel Cadmium Battery Plates" published Dec. 6, 1948 in the Journal of the Electrochemical Society, vol. 94, No. 6, pgs. 289–299. The active electrode substance for the positive electrode plate 17 consists of a first form of nickel hydroxide (Ni(OH)$_2$ which, when fully charged, is converted into a second form of nickle hydroxide NiO(OH) in which nickel is present in a higher oxidation state. The active electrode substance for the negative electrode plate 18 consists of cadmium hydroxide Cd(OH)$_2$ which, when fully charged, is converted into metallic cadmium. The eletcrolyte employed in cells of this type typically comprises a 20 to 30 percent (by weight) soluiton of potassium hydroxide in water.

As shown in FIGURE 2, the coiled electrode assembly 12 has a hollow central passage 21 and is designed to fit tightly within the space enclosed by the side wall 14 and the bottom wall 16 of the cell casing 13. The axis of the coiled electrode assembly 12 is generally coaxial with the axis 22 of the casing 13.

The casing 13 is also provided with an integral top wall or cover 23 having a rim fused or welded to the surrounding casing edge 23–1 as discussed in aforementioned U.S. Patent No. 3,064,065. Top wall 23 has a centrally disposed circular aperture 24. A significant portion of the top wall 23 has a thickness substantially greater than that of the tubular side wall 14 to provide increased resistance to deformation by internal gas pressure generated in the cell 11 during periods of charging.

Disposed within the aperture 24 of top wall 23 is an elongated metallic terminal member 26 spaced from the metallic periphery of the aperture 24 by an annular insulating collar 27. The collar 27 is formed from high density, liquid-and-gas-tight ceramic material which may be of the type similar to that used in making gas-tight envelopes for vacuum tubes. In particular, the material of the collar 27 is designed to have high resistance to corrosion by the alkaline electrolyte of the cell 11. As an example, good results are obtained with the use of ceramic material consisting of high density, fired and matured ceramic soilds containing 94 to 96 percent of alumina or aluminum oxide. Good results are also obtained with ceramic material consisting principally of zircon, a combination of zircon and alumina, or of sterite of the type described in U.S. Patent No. 2,912,340.

The terminal member 26 extends through the ceramic collar 27 and the aperture 24 in the top wall 23 to the interior of the cell 11. As shown the terminal member 26 is of tubular form and has an externally projecting end portion 26–1. In the embodiment shown, the terminal member 26 may advantageously be formed of a nickel-iron alloy containing 50 percent nickel and 50 percent iron, or alternatively of a nickel-cobalt alloy distributed under the trade name "Kovar."

The positive and negative electrode plates 17 and 18 of the battery cell 11 are respectively connected to the insulated terminal member 26 and to the metallic casing 13. In the form shown, the positive electrode plate 17 is connected to the terminal member 26 by means of a first strip or tab 31 spot-welded to an inner wall surface 32 of the terminal member 26. Similarly, the negative electrode plate 18 is connetced to the casing 13 by means of a second strip or tab 33 spot-welded to the bottom wall 17 of the casing.

The tab 33 is insulated from the positive electrode 17 at the bottom end of the electrode assembly 12 by means of a first insulating sheet 34, typically of nylon, which contains an aperture 36 through which tab 33 passes. Similarly, tab 31 is insulated from the negative electrode 18 at the top of the electrode assembly 12 by a second insulating sheet 37 containing an aperture 38 through which tab 31 passes. In addition, a third apertured nylon sheet 39, typically of split ring construction, is disposed around an outer surface 40 of the inwardly projecting portion of terminal member 26 to insulate the tab 31 from the metallic top wall 23 of the casing 13.

An outer circumferential surface 41 of ceramic collar 27 is metallically coated and joined by a first gas-tight metallic junction layer 42 to the periphery of aperture 24 in the top wall 23. In like manner, an inner circumferential surface 43 of ceramic collar 27 is metallically coated and joined by a second gas-tight metallic junction layer 44 to the outer surface 40 of the terminal member 26. Any suitable process for forming fused metallic seals between a ceramic body and an adajcent metal body may be used in forming the junctions 42 and 44. For instance, in one process (known in the industry as the "Telefunken" process), a thin coating of fine metallic powder consisting of molybdenum with manganese is applied to the inner and outer circumferential surfaces 41 and 43 of the ceramic collar 27. The metallic powder is held in a suitable coating medium such as nitrocellulose lacquer. The coated ceramic collar 27 is then heated for a half hour at 350° C. in a protective atmosphere of nitrogen wherein the applied molybdenum-manganese mixture forms homogeneous metallic strata on the surfaces 41 and 43.

Alternatively, in the so-called "Bondley" process, the metallized strata on the surfaces 41 and 43 is formed either with titanium hydride or with zirconium hydride. As an example, fine titanium hydride powder is first mixed with a suitable binder such as nitrocellulose lacquer, and is then applied as a thin coating to the inner and outer surfaces 41 and 43. The ceramic collar 27 is then heated to a temperature in the range of 1100° C. to 1300° C. under vacuum, whereupon the titanium hydride decomposes and its titanium content forms a metallic stratum on each of the surfaces 41 and 43 in the presence of pure hydrogen evolved by the hydride.

The metallic surface strata deposited on the surfaces of the ceramic collar 27 by any of the above-mentioned processes are then respectively joined by a suitably brazing metal to the metallic periphery of the aperture 24 and to the outer metallic surface 40 of the terminal member 26. The brazing composition employed may advantageously consist of a eutectic alloy of nickel and gold, or silver solder composition.

While the resulting metallic fused junctions 42 and 44 are generally liquid-tight as well as gas-tight, it has been found that the metallized strata on the surfaces 41, 43 of the surfaces 41, 43 of the ceramic collar 27 may be attacked and corroded by the alkaline electrolyte employed in the battery cell 11. This corrosion eventually destroys the fusion seals 42, 44 and thus the usefulness of the cell 11.

In acocrdance with the invention, a pair of alkali-resistant glass fusion seals 46, 47 are formed around annular portions 48, 49 of the metallic fusion seals 42, 44 that are exposed to the electrode assembly 12 within the battery cell 11.

The glass seals 46, 47 are preferably formed by fusing layers of pulverized or granulated gas-tight glass that are placed around the periphrey of the annular portions 48, 49 of the fusion seals 42, 44. It has been found that seals formed from borosilicate glass such as that distributed under the trade name "Corning 9010," or other alkali-resistant glass which has a melting temperature significantly below that of the fused metallic junctions 42, 44, provide adequate protection against alkaline corrosion without destroying the gas pressure-resistant properties of the primary fusion seals 42, 44. Advantageously, the pulverized glass layers are applied after the metallic fusion seals 42, 44 are formed, and the pulversized layers are then fused into alkali-resistant, liquid-tight seals over the primary fusion seals 42, 44 in an oven (not shown) that is heated to a suitable temperature.

In assembling a cell of the type shown in FIGURES 2 and 3, the electrode assembly 12 is first inserted through the upper open end of tubular casing 14 (as seen in FIG. 2). The bottom tab 33 of the electrode assembly is welded at 33–1 to the casing bottom wall 16. The opposite electrode tab 31 is then welded at 32 to the insulated terminal 40 of the top wall assembly, and the previously finished top wall assembly 23, 27, 26, which is thereafter placed within the opening of the tubular casing. Thereupon, the rim of the top wall 23 is welded to the upper edge of the casing 13 at 23-1 to complete the casing seal.

In the foregoing the invention has been described in conjunction with batteries having a tubular metallic casing suitable for use in applications such as conventional flashlights. It will be understood, however, that the present invention is applicable to sealed alkaline battery cells having cell casings of many shapes (oval, rectangular or the like) as required in different specific applications. Since these and many other variations will now become obvious to those skilled in the art, it is accordingly desired that the breadth of the claims not be limited to the specific disclosure herein contained.

The embodiments of the invention in which an exclusive privilege or property is claimed are defined as follows.

1. In a sealed, rechargeable alkaline battery cell:
   a metallic casing defining an open-ended volume and an opposite polarity electrode assembly and an electrochemically cooperative alkaline electrolyte within said casing;
   said casing having a metallic wall section of substantial thickness and an elongated passage through said wall to the casing interior;
   an electrically conductive terminal member located within said wall passage and electrically connected to one polarity electrode of said electrode assembly;
   an alkali-resistant collar of ceramic material having first and second insulatingly spaced ceramic juncture surface regions, in juxtaposition relationship, respectively, with respect to juncture surfaces of said wall passage and said terminal member;
   each of said ceramic juncture surface regions having a thin adherent metallic juncture coating,
   first and second solidified metallic fusion sealing layers fusing the metallic juncture coatings of said first and second ceramic juncture surface regions in juxtaposition relationship, respectively to said juncture surfaces of said wall passage and said terminal member, and constituting two leak tight casing seals at said two juxtaposed ceramic and metallic juncture surfaces;
   the improvement in combination therewith comprising protective seal means of solidified molten glass interposed between the inwardly facing regions of said first and second metallic coatings of said two ceramic juncture surfaces and said two metallic fushion layers constituting said two leak tight casing seals, and also overlapping the adjoining metallic surface regions of said wall and said terminal member,
   said solidified molten glass having a melting temperature lower than the metal of said metallic fusion layer and being fused to said inwardly facing regions of said two fused metal layers and said ceramic metal coatings and the adjoining regions of said ceramic collar and nearby metallic surface portions of said wall and said terminal member,
   and constituting a barrier means for suppressing penetration of electrolyte from the casing interior to said two metallic fusion layers.

2. In a battery cell according to claim 1;
   the metallic coating on said first and second surface regions containing molybdenum.

3. In a battery cell according to claim 1;
   the metallic coating on said first and second surface regions containing principally molybdenum and manganese.

References Cited

UNITED STATES PATENTS

| | | | |
|---|---|---|---|
| 2,508,354 | 5/1950 | Brinson | 287—189.365 |
| 3,049,792 | 8/1962 | Kohl | 65—59 |
| 3,083,249 | 3/1963 | Belove. | |
| 3,142,886 | 8/1964 | Bronson et al. | 65—59 |
| 3,167,418 | 1/1965 | Hopkins et al. | 65—59 |
| 3,192,497 | 6/1965 | Bender et al. | 65—59 |
| 3,064,065 | 11/1962 | Belove. | |

WINSTON A. DOUGLAS, *Primary Examiner.*

A. SKAPARS, *Assistant Examiner.*

U.S. Cl. X.R.

136—133